May 31, 1949.  A. BECOTE  2,471,715
DEVICE FOR PRODUCING RECTILINEAR MOVEMENT OF THE
OPTICAL ASSEMBLY IN CINEMATOGRAPH APPARATUS
Filed Aug. 7, 1947  2 Sheets-Sheet 1
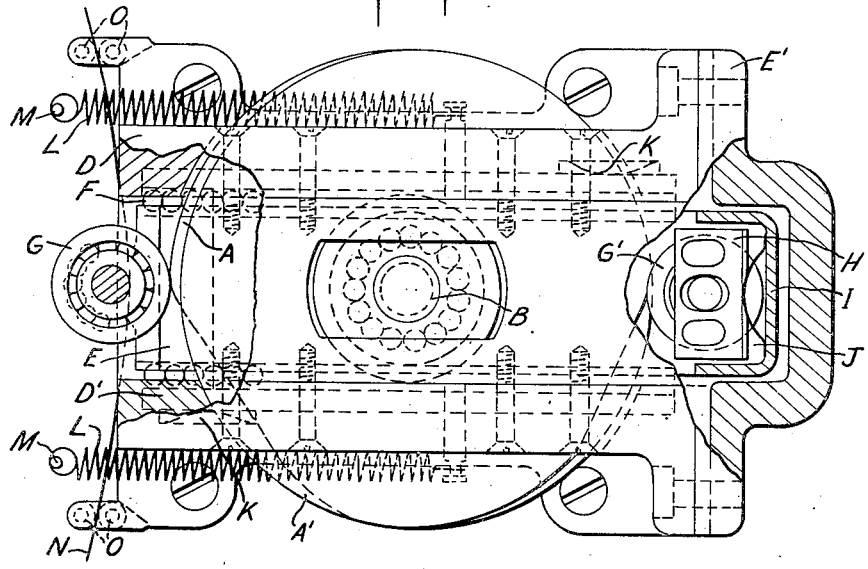
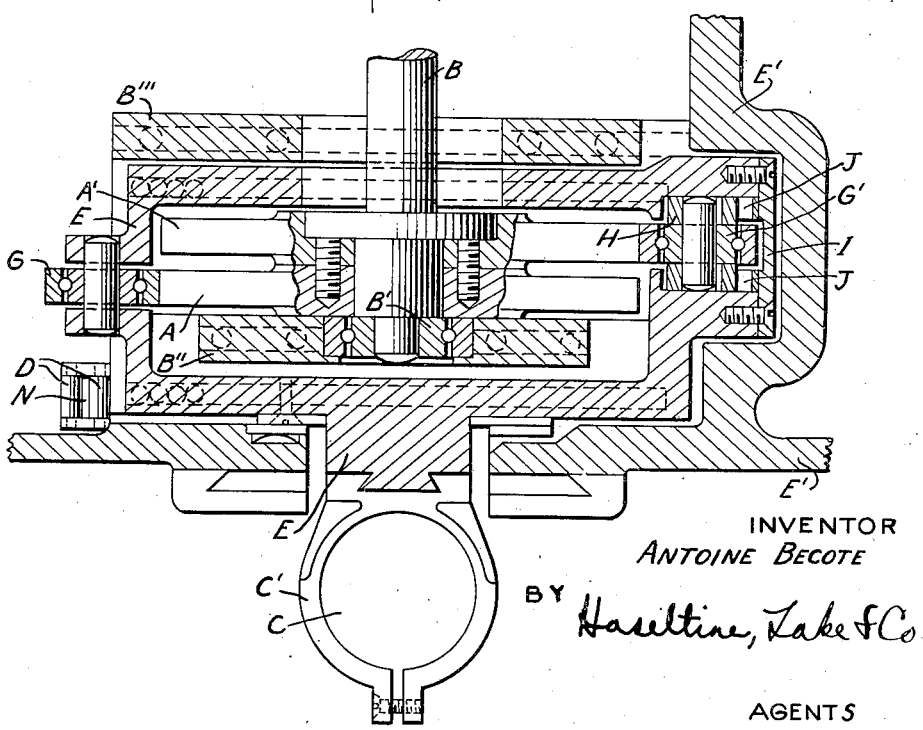
INVENTOR
ANTOINE BECOTE
AGENTS May 31, 1949. A. BECOTE 2,471,715
DEVICE FOR PRODUCING RECTILINEAR MOVEMENT OF THE
OPTICAL ASSEMBLY IN CINEMATOGRAPH APPARATUS
Filed Aug. 7, 1947 2 Sheets-Sheet 2
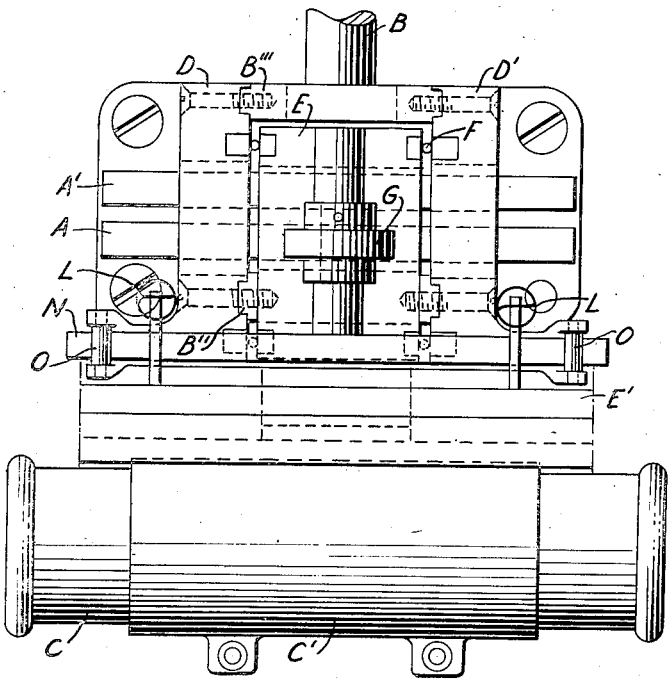
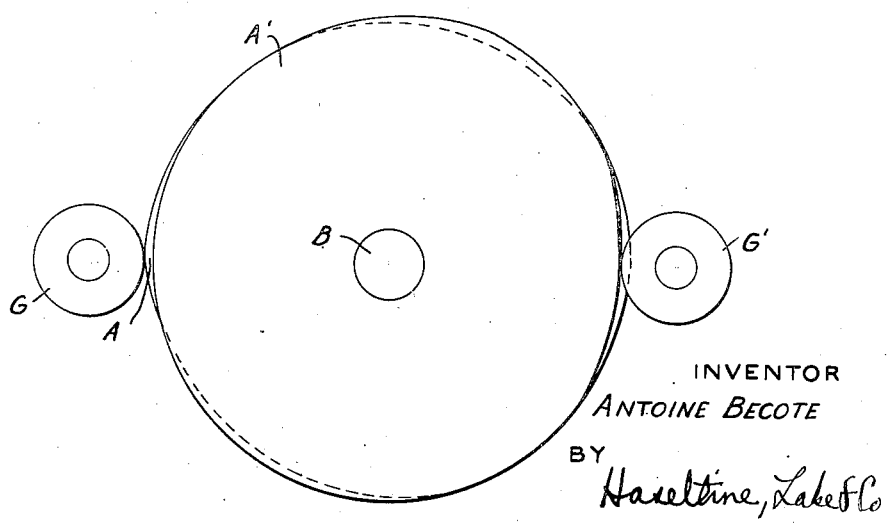
INVENTOR
ANTOINE BECOTE
BY
Haseltine, Lake & Co
AGENTS

Patented May 31, 1949

2,471,715

UNITED STATES PATENT OFFICE 2,471,715

DEVICE FOR PRODUCING RECTILINEAR MOVEMENT OF THE OPTICAL ASSEMBLY IN CINEMATOGRAPH APPARATUS

Antoine Bécote, St. Etienne, France

Application August 7, 1947, Serial No. 767,233
In France December 18, 1941

Section 1, Public Law 690, August 8, 1946
Patent expires December 18, 1961

5 Claims. (Cl. 88—16.8)

This invention relates to means for producing rectilinear movement of the optical assembly in cinematograph apparatus.

In such apparatus it has already been proposed to obtain a quick alternating movement of the objective as suggested in French Patent No. 800,375 of January 6, 1936, in which there is described an arrangement of a cam control with two rollers and two interposed controls with a retracting spring, but in use and in order to give more smoothness to the movement it appears necessary to design a device with twin cams acting alternately to produce rectilinear motion of the optical assembly in cinematograph projection apparatus with continuous unwinding of the film.

The invention will now be described, by way of example, with reference to the accompanying drawings, in which—

Figure 1 is a front elevation partly in section of the device with twin cams.

Figure 2 is a sectional side view corresponding to Figure 1 of the device with twin cams.

Figure 3 is an outside plan view corresponding to Figure 1.

Figure 4 is a diagrammatic view of the two twin cams.

Referring to the drawings, two twin cams A—A' of appropriate and similar cross-sectional shape are coupled together on the same drive shaft B, but are arranged to act alternately in the following manner. The cam A starts from the high point to the low point of the initial travel and the other cam A' from the low point to the high point, this being to effect the movement of the optical system or objective C which is enclosed in a collar C' secured to the movable cage E (the reciprocating upward and downward movement of the objective has already been described in French Patent specifications Nos. 760,778 of December 6, 1932, and 783,926 of January 9, 1935.

The optical system C is carried by a movable cage E arranged between right hand and left hand uprights or guideways D—D' which are secured to the case E' mounted on the cinematograph apparatus.

The movable cage E slides between the uprights D—D' and in order that it may slide more smoothly, the uprights D—D' are each provided with balls F or rollers, or ball bearings. The central portion and also the two sides of the movable cage E are hollowed out to enable the two cams A—A' to rotate freely inside, so as to produce the desired movement.

The end of the drive shaft B bears against a ball bearing B' housed in an inner cross-member B'' secured to the uprights D—D'. On the front face, the uprights D—D' are connected together by a hollow cross-member B'''.

The connection of the movement between the cams A—A' and the movable cage E is as follows:

Two rollers or anti-friction bearings G—G' are mounted, one at the top, the other at the bottom of the movable cage E, each of said rollers G—G' being adapted to bear against and follow the edge of the corresponding cam. The roller G' is mounted on a movable guide H supported by a plate I secured to the movable cage E, the said roller being maintained in engagement with the edge of the corresponding cam by means of leaf spring J. The arrangement is such as to compensate for any wear or play which may occur during operation and by this means the movable cage E, which is supported at the top and at the bottom cannot have any reaction and is perfectly guided. The compensation for side play between the cage E and its guideways is effected by means of springs K.

In order to obtain a smoother and more flexible movement and to reduce the inertia of the movable cage E, it may be statically and dynamically balanced by means of helical springs L connected to the base of the movable cage E and to fixed points of attachment M on the case E'. A similar effect may be obtained, if desired, by means of counterweights or by compressing a liquid in a piston or by any other suitable system. It is also possible to produce a vibratory movement by means of springs acting in opposition, i. e. by action and reaction of counter-reaction of the movement.

In the arrangements described above the weight of the optical system, and also that of the movable cage E which carries it, is no longer involved and the shifting time can be reduced, thereby enabling the shutter to be eliminated.

The operation of the device is as follows:

When the shaft B carrying the two cams A and A' is rotated one revolution, the movement of one cam increases while that of the other decreases. The movable cage E is engaged at the top by its roller G and the cam A, and the bottom by its roller G' and cam A'. The movable cage E is thus locked between them and follows perfectly the reciprocating upward and downward movement between the uprights D—D'.

In order to obtain a very smooth movement and eliminate the friction as indicated, said uprights D are provided with balls and the roller G' at the bottom of the movable cage E is mounted on a guide so that it can slide freely.

The engagement of the roller G' with the edge of the cam A is obtained by means of the spring blades J, this being in order to absorb the impact or reaction of the movement and also to compensate for play or wear which might occur. Springs K are also provided to take up any lateral play which might occur between the movable cage E and the uprights D—D'. In order to obtain a very flexible movement, the inertia of the cage is reduced by balancing it statically and dynamically by means of helical springs L and a leaf spring N which slides between the rollers O.

The diagrammatic view of Fig. 4 of the profile of the cams A—A shows that each cam is formed with a very gentle slope corresponding to the time required by the optical system or objective to follow the picture of the film and then to have a quick upward movement, the shifting time when the optical system takes up the next picture. The orientation of the two twin cams A—A' is also shown with their difference of setting and also the two rollers G—G' fixed to the movable cage E for controlling same. It should be noted that if these movements were reproduced several times on the periphery of the slopes of the cams A—A', this movement would be reproduced as many times by effecting a rotation of their drive shaft. All these arrangements apply to cameras and also to the other systems described in the aforesaid prior patents. It will be understood that the system hereinbefore described, may be applied in various other applications.

I claim:

1. In a kinematographic apparatus of the continuous film unwinding type, the provision of an optical system and means for producing a reciprocating rectilinear movement of the latter comprising a rotary shaft, two cams rigid with the shaft the shape and setting of which cams is such that the uppermost tangent to one cam and the lowermost tangent to the other cam are permanently spaced by a constant distance for all angular settings of the shaft, a stationary frame rigid with the apparatus and including vertical slideways, a movable cage slidingly carried between said slideways and carrying the optical system and rollers rotatably carried at the upper end and at the lower end of the cage and operatively engaging respectively the upper portion of the first cam and the lower portion of the second cam.

2. In a kinematographic apparatus of the continuous film unwinding type, the provision of an optical system and means for producing a reciprocating rectilinear movement of the latter comprising a rotary shaft, two cams rigid with the shaft the shape and setting of which cams is such that the uppermost tangent to one cam and the lowermost tangent to the other cam are permanently spaced by a constant distance for all angular settings of the shaft, a stationary frame rigid with the apparatus and including vertical slideways, a movable cage slidingly carried between said slideways and carrying the optical system, rollers rotatably carried at the upper end and at the lower end of the cage and operatively engaging respectively the upper portion of the first cam and the lower portion of the second cam, a leaf spring the ends of which are slidingly secured to the frame and the medial portion of which bears against the movable cage for urging it in a predetermined direction and helical springs connecting the frame with points of the movable cage for urging it vertically in the opposite direction.

3. In a kinematographic apparatus of the continuous film unwinding type, the provision of an optical system and means for producing a reciprocating rectilinear movement of the latter comprising a rotary shaft, two cams rigid with the shaft the shape and setting of which cams is such that the uppermost tangent to one cam and the lowermost tangent to the other cam are permanently spaced by a constant distance for all angular settings of the shaft, a stationary frame rigid with the apparatus and including vertical slideways, a movable cage slidingly carried between said slideways and carrying the optical system, two rollers cooperating respectively with the upper and lower end of the cage, means for securing said rollers to the cage one of which means is rigid with the movable cage and means for yieldingly connecting the other carrying means with said movable cage.

4. In a kinematographic apparatus of the continuous film unwinding type, the provision of an optical system and means for producing a reciprocating rectilinear movement of the latter comprising a rotary shaft, two cams rigid with the shaft the shape and setting of which cams is such that the uppermost tangent to one cam and the lowermost tangent to the other cam are permanently spaced by a constant distance for all angular settings of the shaft, a stationary frame rigid with the apparatus and including vertical slideways, a movable cage slidingly carried between said slideways and carrying the optical system, leaf springs arranged between the vertical surfaces of the frame and the movable cage for taking up side play, rollers rotatably carried at the upper end and at the lower-end of the cage and operatively engaging respectively the upper portion of the first cam and the lower portion of the second cam.

5. In a kinematographic apparatus of the continuous film unwinding type, the provision of an optical system and means for producing a reciprocating rectilinear movement of the latter comprising a rotary shaft, two cams rigid with the shaft assuming the same shape and set in opposed angular relationship, a stationary frame rigid with the apparatus and including vertical slideways, a movable cage slidingly carried between said slideways and carrying the optical system, two rollers cooperating respectively with the upper and lower ends of the cage, means for securing said rollers to the cage one of which means is rigid with the movable cage and means for yieldingly connecting the other carrying means with said movable cage.

ANTOINE BÉCOTE.

REFERENCES CITED

The following references are of record in the file of this patent:

UNITED STATES PATENTS

| Number | Name | Date |
|---|---|---|
| 1,317,450 | Momyer | Sept. 30, 1919 |
| 1,798,793 | Hall | Mar. 31, 1931 |
| 1,914,854 | Hall | June 20, 1933 |

FOREIGN PATENTS

| Number | Country | Date |
|---|---|---|
| 760,778 | France | Dec. 27, 1933 |